United States Patent [19]
Pond

[11] 3,778,976
[45] Dec. 18, 1973

[54] DEGASSING APPARATUS FOR A FISH AQUARIUM OR THE LIKE

[75] Inventor: Robert B. Pond, Mansfield, Mass.

[73] Assignee: Atom Manufacturing Co., Inc., South Attleboro, Mass.

[22] Filed: Jan. 21, 1972

[21] Appl. No.: 219,679

[52] U.S. Cl. .................................. 55/206, 210/169
[51] Int. Cl. ...................... B01d 47/02, E04h 3/20
[58] Field of Search ................ 55/52, 53, 196, 199, 55/206; 210/63, 150, 151, 169, 218; 119/5

[56] References Cited
UNITED STATES PATENTS

| | | |
|---|---|---|
| 2,356,405 | 8/1944 | Hermes .............................. 210/218 |
| 3,336,099 | 8/1967 | Czulak et al. ....................... 210/169 |
| 2,865,617 | 12/1958 | Dickens et al. ..................... 210/63 |
| 3,377,777 | 4/1968 | Isomura ............................. 55/199 |
| 3,624,777 | 11/1971 | Gardner ............................. 210/169 |
| 3,487,440 | 12/1969 | Newsteder ......................... 210/169 |

Primary Examiner—Charles N. Hart
Attorney—Elliot A. Salter et al.

[57] ABSTRACT

Degassing apparatus for a fish aquarium or the like comprising means for feeding the contaminated water from the aquarium to the upper end of the degasser housing, the housing having baffle means for causing the water to flow downwardly therethrough in a zigzag path and in a thinned-out state, until the water reaches a lower chamber, porous means such as an air stone forming the bottom of said lower chamber and defining the top wall of an air chamber located thereneath, means for introducing air under pressure into said air chamber whereby said air is forced upwardly through the porous means to effect the desired gaseous exchange with the thinned-out water in order to reconstitute same, and means for recycling the reconstituted water back to the aquarium.

5 Claims, 1 Drawing Figure

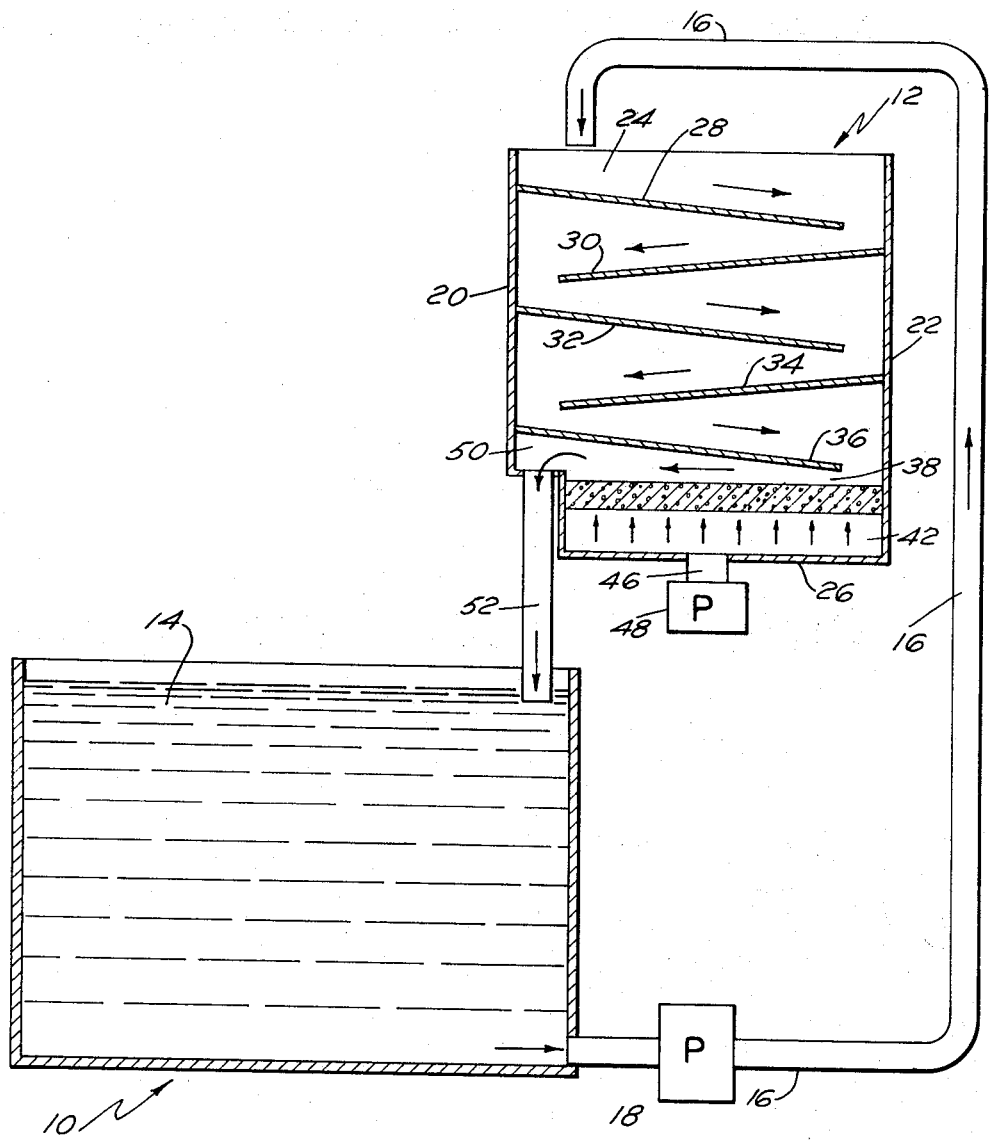

DEGASSING APPARATUS FOR A FISH AQUARIUM OR THE LIKE

BACKGROUND AND SUMMARY OF THE INVENTION

It is a well-known fact that the water in a fish aquarium becomes contaminated as a result of the fish waste, which contamination takes the form of excessive carbondioxide and ammonia in the water, thus rendering the water unsafe for fish life. In order to overcome this problem, it has been found desirable to remove the contaminated water from the fish aquarium and feed it to a degassing or purifying unit in order to reconstitute the water, after which the reconstituted water is recycled back to the aquarium. It will be understood that the cycling of the contaminated water to the degasser where it is reconstituted and then back to the aquarium is a continuous cycle, whereby fresh, natural water is always flowing, while at the same time contaminated water is constantly being removed therefrom.

The problem which has existed has been to provide simple and yet effective degassing means whereby the contaminated water may be quickly and yet efficiently reconstituted. This constitutes the basic object of the present invention.

The usual technique employed in the purifying or reconstituting of contaminated water of this type is to aerate the contaminated water by blowing air therethrough in order to effect a gaseous interchange between the air and the contaminated water. More specifically, pursuant to the theory in physics known as the law of partial pressures, when contaminated water is aerated the gases from the air will exchange with those in the water to maintain an equilibrium between the gases in the air and those in the water. Thus, by aerating the contaminated water, there is a natural tendency for the contaminated water to again assume the same gaseous composition as the air being infiltrated, whereby the impurities in the water, such as $CO_2$ and ammonia, are removed and are replaced with oxygen from the air, whereby the water is once again reconstituted to assume its natural state. It has been found, however, that this gaseous interchange takes place only at the water surface; and hence in carrying out the objectives of the present invention, the degassing apparatus which receives the contaminated water from the fish aquarium is provided with a series of baffles which cause the water to flow downwardly in a zigzag path, and in a very much thinned-out state. This thinning out or stretching of the contaminated water in effect causes the water to assume a film-like configuration whereby the water surface is maximixed, thus resulting in more effective gaseous interchange when air is blown over and through the thinned-out water.

Thus, a primary objective of my invention is the provision of degassing apparatus having means for thinning out or stretching the contaminated water so as to maximize the surface area thereof, said apparatus further comprising means for blowing air into contact with the thinned-out water in order to create an effective gaseous interchange which reconstitutes the water to once again assume a fresh, natural state.

A further object is the provision of apparatus of the character described that is not only effective in use, but is also extremely simple and economically feasible to manufacture and operate, and which may be readily associated with existing fish aquariums.

Other objects, features and advantages of the invention will become apparent as the description thereof proceeds when considered in connection with the accompanying illustrating drawing.

DESCRIPTION OF THE DRAWING

The single FIGURE schematically shows a fish aquarium in combination with degassing apparatus comprising the present invention.

DESCRIPTION OF THE INVENTION

Referring now to the drawing, a conventional fish aquarium illustrated generally at 10 is shown in combination with degassing apparatus comprising the present invention, generally illustrated at 12. The aquarium 10 is of conventional construction and has a supply of water 14 therein, which water in normal use becomes contaminated as a result of the fish waste, the contamination most usually taking the form of excessive $CO_2$ and ammonia in the water. Conduit means 16 are in communication with the water 14 adjacent the lower end of aquarium 10, said conduit being associated with a pump 18 which causes the contaminated water to continuously flow through the conduit 16 to the degassing apparatus 12, which will now be described in detail.

The degassing apparatus 12 comprises a housing defined by front wall 20, rear wall 22, side walls 24, and bottom wall 26. Extending from one side wall to the other are a plurality of baffle plates 28, 30, 32, 34 and 36. More specifically, it will be noted that upper baffle plate 28 extends from front wall 20 in a downward inclination, and terminates in spaced relation to rear wall 22. The next lower baffle plate 30 extends from rear wall 22 in a downward inclination and terminates in spaced relation to front wall 20, while each succeeding plate is similarly staggered. Below the bottom baffle plate 36 is a lower chamber 38 defined by an end wall 40 and by a porous air stone 42 which functions as the bottom wall of lower chamber 38. Beneath the air stone 42 is an air chamber 44 into which air under pressure is pumped through conduit 46 via pump 48. As will be noted, lower chamber 38 has an exit opening 50 in communication with conduit 52 which carries the reconstituted water back to aquarium 10, thus completing the cycle.

In operation and use, contaminated water from the aquarium 10 is pumped through conduit 16 by means of pump 18 to the upper end of degassing apparatus 12, whereupon the water engages upper baffle plate 28 and commences to flow downwardly in the zigzag path illustrated in the drawing. The arrangement of the baffle plates causes the water to thin out or stretch so as to assume almost a film-like consistency, it having been found in actual practice that the water will thin out to a film having a depth of less than fifteen-thousandths of an inch. This thinning out or stretching of the water maximizes the water surface, whereby, when the air passing upwardly through the degasser flows over the thinned-out water, maximum gaseous interchange between the air and the water will take place. Expressed differently, the oxygen from the air will interchange with the $CO_2$ and ammonia in the water in order to reconstitute the water so that the latter once again assumes its natural, fresh state. It will be understood that the constant flow of pressurized air upwardly through the porous air stone will prevent water in chamber 38 from seeping downwardly through the stone into air chamber 44, but rather the reconstituted water will be caused to flow over the upper edge of end wall 40 through opening 50 to conduit 52 which then recycles the reconstituted water back to aquarium 10.

As previously mentioned, the arrangement of the baffle plates has been found to be an extremely important feature of the present invention, although obviously the exact number of baffle plates is not critical. It will further be understood that as the water reaches the end of each baffle plate and cascades downwardly to the next lower plate, a waterfall effect is created which facilitates and enhances subsequent reconstitution of the water. Not only does the degassing apparatus 12 remove the gaseous impurities in the water resulting from the fish waste, but also undesirable air bubbles which may be created by pump 18 and which would be deleterious to fish life are effectively removed.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A degasser for fish aquariums and the like comprising a housing having a front wall, a rear wall, a pair of side walls and a bottom wall, a plurality of superimposed baffles in said housing extending from side wall to side wall, the uppermost baffle starting at the front wall and terminating in spaced relation to the rear wall and being inclined downwardly from front to rear, the next lower baffle starting at the rear wall and terminating in spaced relation to the front wall and being inclined downwardly from rear to front, whereby water flowing over said baffles will be thinned out and will flow downwardly in a zigzag path, cascading downwardly over the end of each baffle onto the next lower baffle, first means for feeding water to be reconstituted into the top of said housing, an air chamber located at the bottom of said housing, means for introducing pressurized air into said air chamber, porous means defining the top wall of said air chamber, said porous means permitting pressurized air from said air chamber to pass upwardly therethrough, while at the same time preventing the thinned-out water flowing thereabove to seep downwardly therethrough, whereby air passing upwardly through said porous means and coming into contact with the thinned-out water flowing thereabove will effect the desired gas exchange in said water to reconstitute same, and second means for feeding said reconstituted water from said housing to its desired point of use.

2. In the degasser of claim 1, said housing being operatively connected to a fish aquarium, said first and second feeding means comprising conduits extending between said housing and said aquarium, whereby water to be reconstituted flows from said aquarium to said housing and then is recycled back to said aquarium after being reconstituted.

3. In the degasser of claim 1, said porous means comprising a porous air stone.

4. In the degasser of claim 1, said second means comprising an opening in said housing through which said reconstituted water passes, said opening being located above the top surface of said porous means.

5. A degasser for fish aquariums and the like comprising a housing, means for feeding water to be reconstituted to the upper end of said housing, means in said housing causing water to flow downwardly therethrough in a zigzag path whereby said water is thinned-out, a lower chamber in said housing receiving said thinned-out water, an air chamber located below said lower chamber and separated therefrom by a porous air stone, means for forcing pressurized air upwardly through said air stone into contact with the thinned-out water flowing through said lower chamber to effect a gaseous exchange therewith to reconstitute same, and outlet means in said lower chamber through which the reconstituted water may flow to its desired point to use.

* * * * *